(12) United States Patent
Zoo et al.

(10) Patent No.: US 11,746,890 B2
(45) Date of Patent: Sep. 5, 2023

(54) SHIFT-BY-WIRE SYSTEM

(71) Applicants: HYUNDAI MOTOR COMPANY, Seoul (KR); KIA CORPORATION, Seoul (KR); SL Corporation, Daegu (KR)

(72) Inventors: Hee En Zoo, Goyang-si (KR); Ki Young Song, Suwon-si (KR); Woo Duck Kim, Hwaseong-si (KR); Sung Tae Kim, Daegu (KR); Sang Eun Bae, Daegu (KR)

(73) Assignees: HYUNDAI MOTOR COMPANY, Seoul (KR); KIA CORPORATION, Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 17/387,635

(22) Filed: Jul. 28, 2021

(65) Prior Publication Data
US 2022/0163107 A1 May 26, 2022

(30) Foreign Application Priority Data
Nov. 23, 2020 (KR) .......................... 10-2020-0158005

(51) Int. Cl.
| | |
|---|---|
| *F16H 59/08* | (2006.01) |
| *B60K 20/06* | (2006.01) |
| *F16H 61/18* | (2006.01) |
| *F16H 59/12* | (2006.01) |
| *F16H 61/24* | (2006.01) |

(52) U.S. Cl.
CPC .............. *F16H 59/08* (2013.01); *B60K 20/06* (2013.01); *F16H 59/12* (2013.01); *F16H 61/18* (2013.01); *F16H 61/24* (2013.01); *F16H 2059/081* (2013.01)

(58) Field of Classification Search
CPC .. H01H 25/065; B60Q 1/1476; B60Q 1/1469; B60Q 1/0082; B60K 20/06; F16H 61/18; F16H 2059/081; F16H 59/12
See application file for complete search history.

(56) References Cited

U.S. PATENT DOCUMENTS 10,067,015 B2 * 9/2018 Lee ........................... G01L 5/22
10,100,919 B1 * 10/2018 Turney ................ F16H 59/0217
(Continued)

FOREIGN PATENT DOCUMENTS

KR 10-1565027 B1 10/2015

*Primary Examiner* — Gregory Robert Weber
(74) *Attorney, Agent, or Firm* — Lempia Summerfield Katz LLC

(57) ABSTRACT

A shift-by-wire system physically prevents shifting to the R/N/D gear position and shifting to the P gear position from being simultaneously performed. The shift-by-wire system includes a body configured to have a Hall sensor provided therein, a knob installed so as to be rotatable around an axis of the body, a button assembly moving in an axial direction of the body and having a magnet provided to sense rotated and moved states thereof using the Hall sensor and rotate together with the knob, and a concurrent operation limiting unit to mechanically limit movement of the button assembly in a state in which the knob is manipulated so as to be rotated, and to mechanically limit rotation of the knob in a state in which the button assembly is manipulated so as to be moved.

17 Claims, 16 Drawing Sheets

(56) References Cited

U.S. PATENT DOCUMENTS

| | | | | |
|---|---|---|---|---|
| 11,014,450 B2* | 5/2021 | Keenan | .................. | F16H 59/02 |
| 11,339,872 B2* | 5/2022 | Kim | ...................... | F16H 59/044 |
| 2017/0018380 A1* | 1/2017 | Kusama | ................ | H01H 19/08 |
| 2017/0191561 A1* | 7/2017 | Seibold | ................. | F16H 59/044 |
| 2017/0282918 A1* | 10/2017 | Chang | .................. | B60W 10/06 |

* cited by examiner

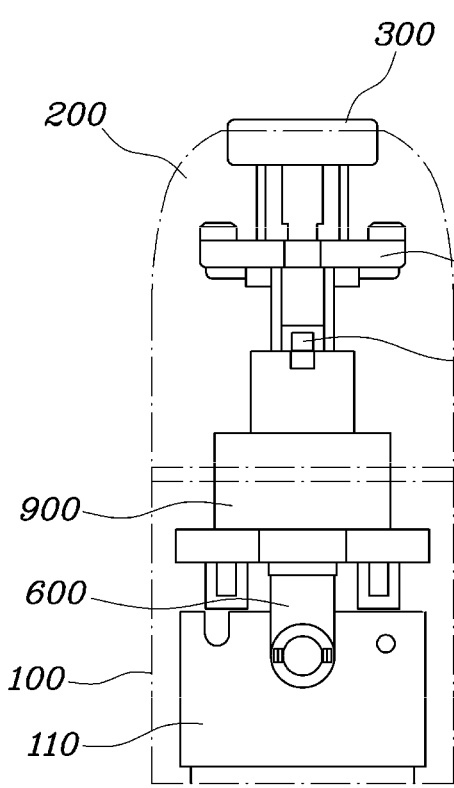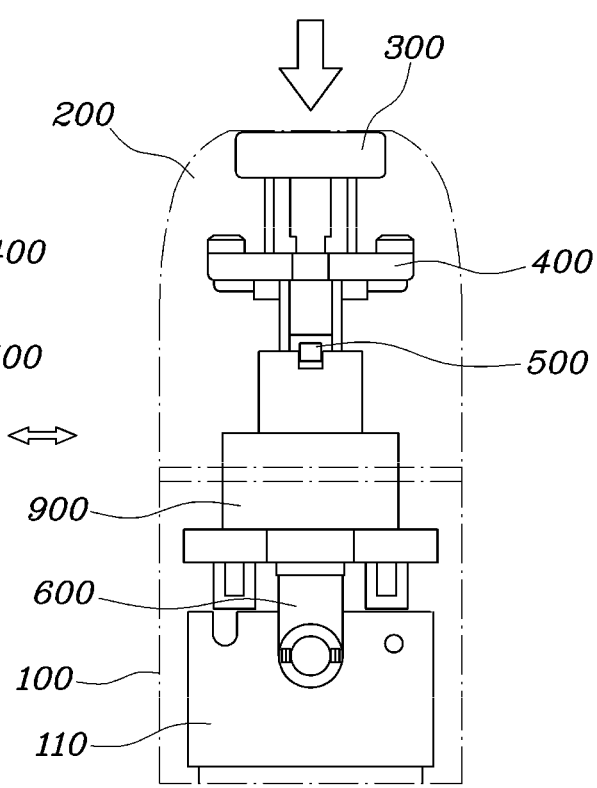

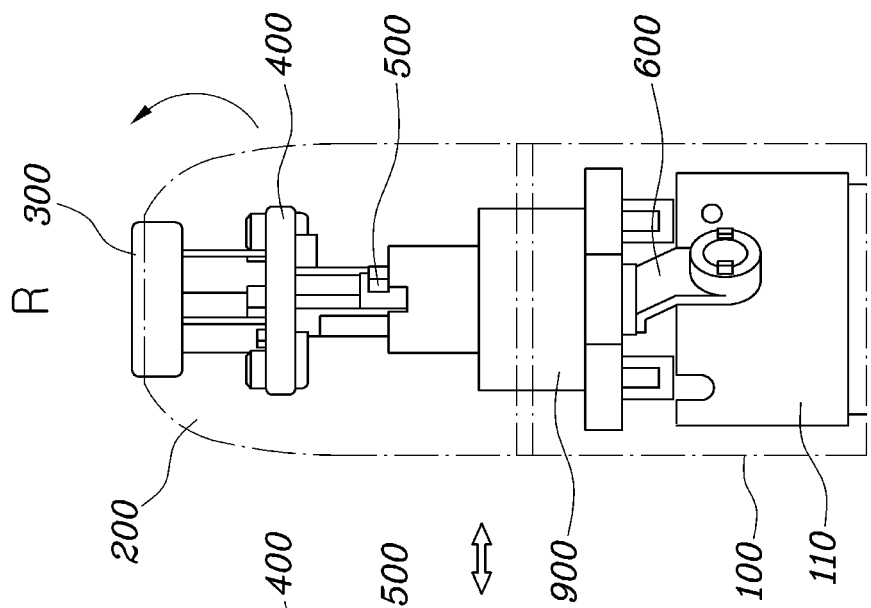
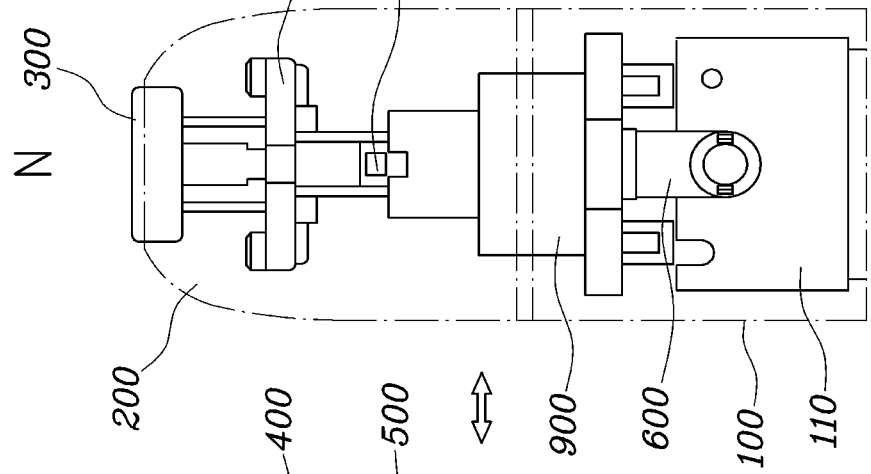
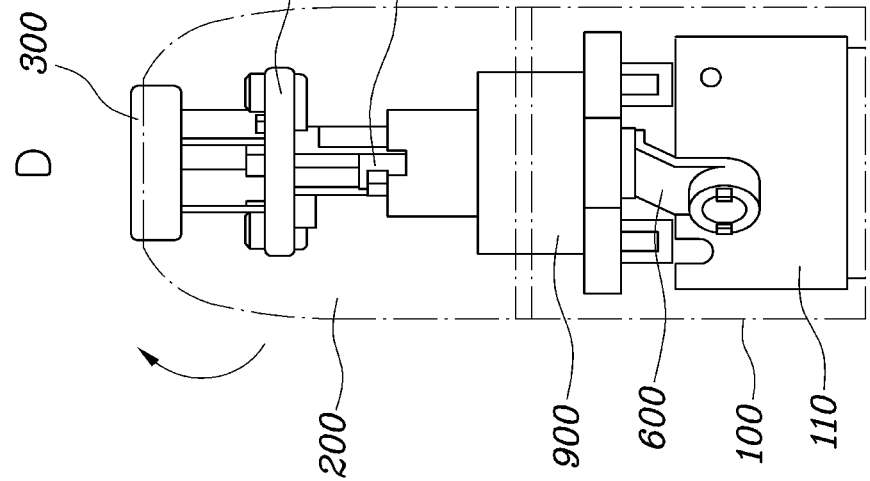

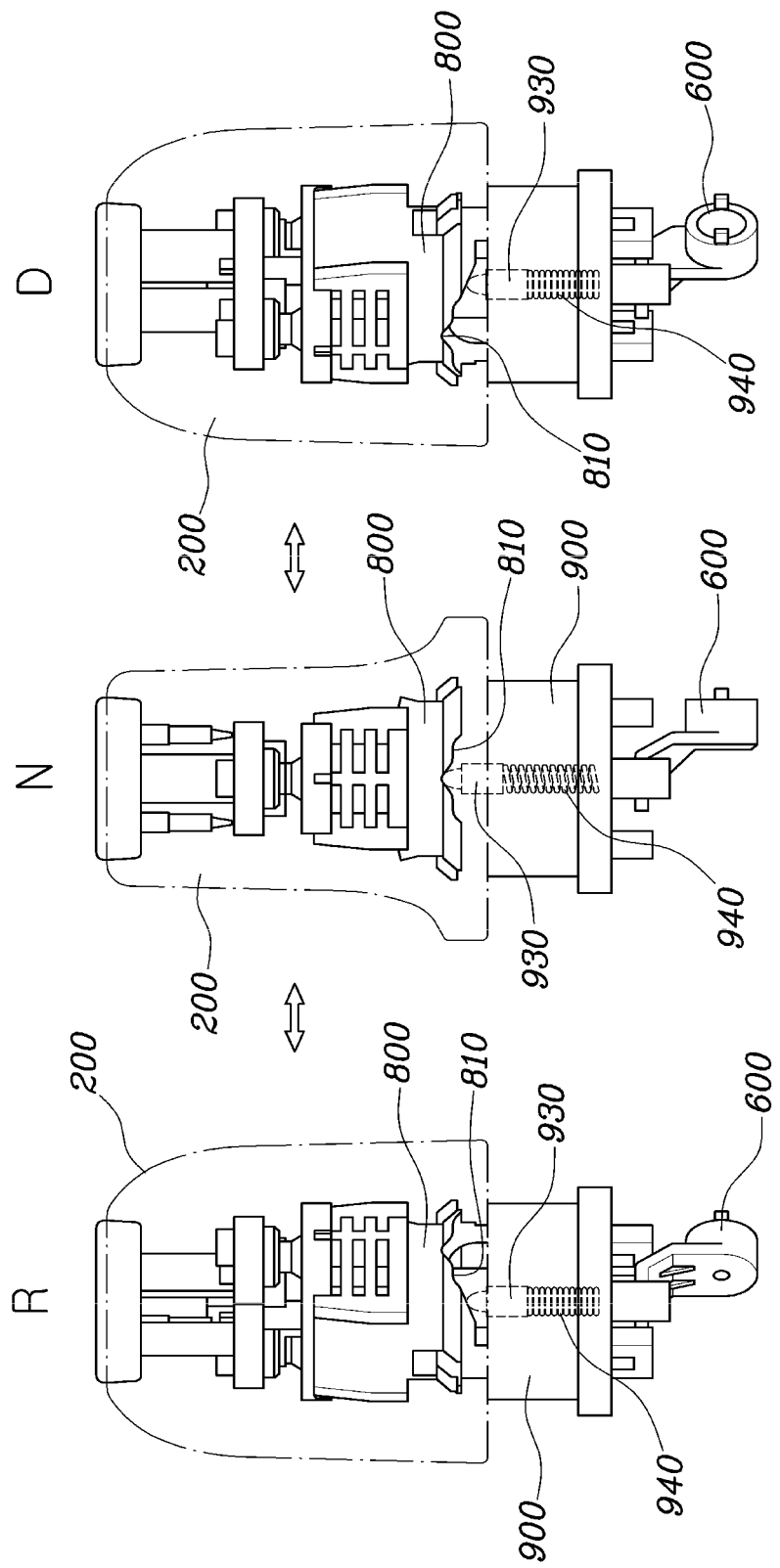

SHIFT-BY-WIRE SYSTEM

CROSS-REFERENCE TO RELATED APPLICATION

This application claims priority to and the benefit of Korean Patent Application No. 10-2020-0158005, filed on Nov. 23, 2020, the entire contents of which are incorporated herein by reference.

FIELD

The present disclosure relates to a shift-by-wire system for a vehicle.

BACKGROUND

The statements in this section merely provide background information related to the present disclosure and may not constitute prior art.

In existing lever-type and dial-type shift-by-wire systems for a vehicle, a sensing structure for shifting to a Reverse (R) gear position, a Neutral (N) gear position and a Drive (D) gear position and a sensing structure for shifting to a Parking (P) gear position are configured separately, and thus a shift switch for shifting to the R/N/D gear position and a PCB and a shift switch for shifting to the P gear position are provided separately.

We have discovered that these shift-by-wire systems allow a driver to physically simultaneously attempt to perform both shifting to the R/N/D gear position and shifting to the P gear position and thereby allow the driver to perform erroneous operation in shifting, thus increasing the driver's psychological anxiety.

The above information disclosed in the Background section is only for enhancement of understanding of the background of the present disclosure and should not be interpreted as conventional technology that is already known to those skilled in the art.

SUMMARY

The present disclosure provides a shift-by-wire system which physically prevents shifting to the R/N/D gear position and shifting to the P gear position from being simultaneously performed by changing the structure of the system.

The present disclosure provides a shift-by-wire system which reduces the size of a package through simplification of a sensing structure and thus reduces costs and increases design freedom.

In an aspect of the present disclosure, a shift-by-wire system includes: a body configured to have a Hall sensor provided therein, a knob installed so as to be rotatable around an axis of the body, a button assembly configured to have a magnet provided to sense rotated and moved states thereof using the Hall sensor, rotated together with the knob, the button assembly configured to move in an axial direction of the body, and a concurrent operation limiting unit configured to mechanically limit movement of the button assembly in a state in which the knob is manipulated so as to be rotated, and to mechanically limit rotation of the knob in a state in which the button assembly is manipulated so as to be moved.

Shifting to a gear position other than a P gear position may be performed depending on rotation of the knob and a rotation direction of the knob, and shifting to the P gear position may be performed depending on movement of the button assembly.

The button assembly may include a button provided at one end of the knob so as to be pressed, a shaft provided in the body in the axial direction and configured to have one end connected to the button, and a magnet holder connected to a remaining end of the shaft and configured to have the magnet mounted at a position thereof corresponding to the Hall sensor.

The concurrent operation limiting unit may include operation prevention protrusions formed on side surfaces of the shaft, a bullet housing fixed to an inside of the body such that the shaft passes through the bullet housing so as to be rotated and rectilinearly moved relative to the bullet housing, and operation prevention recesses formed in one end of the bullet housing corresponding to the operation prevention protrusions.

The operation prevention protrusions may enter the operation prevention recesses due to movement of the button in the axial direction, so that rotation of the operation prevention protrusions is limited, and the operation prevention protrusions may be supported by the end of the bullet housing due to rotation of the knob, so that movement of the operation prevention protrusions in the axial direction is limited.

A button guide may be provided between the button and the shaft, the button guide and the shaft may be coupled to each other by a coupling structure including hooks and grooves, and the magnet holder and the shaft may be coupled to each other by a coupling structure including hooks and grooves.

One end of the magnet holder may be coupled to the shaft, and a middle portion of the magnet holder connected to a remaining end of thereof may be formed in a curved shape.

A mounting recess may be formed in the magnet holder so that the magnet is inserted into the mounting recess, and fusion protrusions may be formed at a circumference of the mounting recess so that the magnet is fixed to an inside of the mounting recess through thermal fusion using the fusion protrusions.

First rotation restraint parts formed on an inner circumferential surface of the body may be inserted into second rotation restraint parts formed on an outer circumferential surface of the bullet housing in the axial direction so as to restrain rotation of the body and the bullet housing relative to each other, and a second movement restraint part formed on an outer circumferential surface of the bullet housing may hang on and be supported by a first movement restraint part formed on an inner circumferential surface of the body in the axial direction so as to restrain movement of the body and the bullet housing relative to each other.

Button legs may be formed at one end of the button so as to extend towards the body, an inner knob may be assembled with the knob so as to be surrounded by an inner surface of the knob, button leg insertion holes may be formed in one end of the inner knob, and the button legs may be inserted into the button leg insertion holes so as to restrain movement of the button and the knob relative to each other.

A button guide may be fixed to one end of the button, and a movement restoration unit configured to provide elastic restoring force with respect to movement of the button guide in the axial direction due to movement of the button may be provided.

The movement restoration unit may include a groove member supported by one end of the bullet housing so that movement of the groove member in the axial direction is limited, and a return member formed of an elastic material and configured to have one end coupled to the groove member and a remaining end having dome parts configured to protrude so as to be pressed by the button guide.

A guide hole may be formed in a center of the button guide, guide legs may be formed at one end of the guide hole so as to extend towards the groove member, a guide bar may be formed at a center of one end of the groove member so as to be inserted into the guide hole, and guide leg insertion holes may be formed in side surfaces of the guide bar so that the guide legs are inserted into the guide leg insertion holes.

A rotation restoration unit configured to provide elastic restoring force with respect to rotation of the button assembly due to rotation of the knob may be provided.

The rotation restoration unit may include a groove member provided to be rotatable relative to the bullet housing while rotation of the groove member is restrained by the button assembly, and configured to have V-shaped grooves formed in a portion of the groove member facing the bullet housing along a rotation path, bullets inserted into bullet insertion grooves formed in the bullet housing so as to be supported by the grooves, and return springs configured to provide elastic restoring force to the bullets towards the grooves.

The bullet insertion grooves may be formed in the axial direction of the body such that openings in the bullet insertion grooves face the groove member, and the return springs may be provided between inner ends of the bullet insertion grooves and the bullets.

In accordance with another aspect of the present disclosure, a shift-by-wire system includes a body configured to have a Hall sensor provided therein, a knob configured to rotate around an axis of the body and thus perform shifting to a gear position other than a parking (P) gear position, a button assembly configured to have a magnet provided to sense rotated and moved states thereof using the Hall sensor, rotated together with the knob, and moved in an axial direction of the body so as to perform shifting to the P gear position, and a concurrent operation limiting unit configured to mechanically limit movement of the button assembly in a state in which the knob is manipulated so as to be rotated, and to mechanically limit rotation of the knob in a state in which the button assembly is manipulated so as to be moved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 5A and 5B are views illustrating an operation of limiting rotation of a knob in the state in which a button is pressed in one form of the present disclosure;

FIGS. 7A, 7B and 7C are views illustrating an operation of limiting pressing of the button in the state in which the knob is rotated in exemplary forms of the present disclosure;

FIGS. 16A, 16B and 16C are views illustrating an operation of restoring rotation of the knob through the rotation restoration unit according to some forms of the present disclosure.

Figure 1:
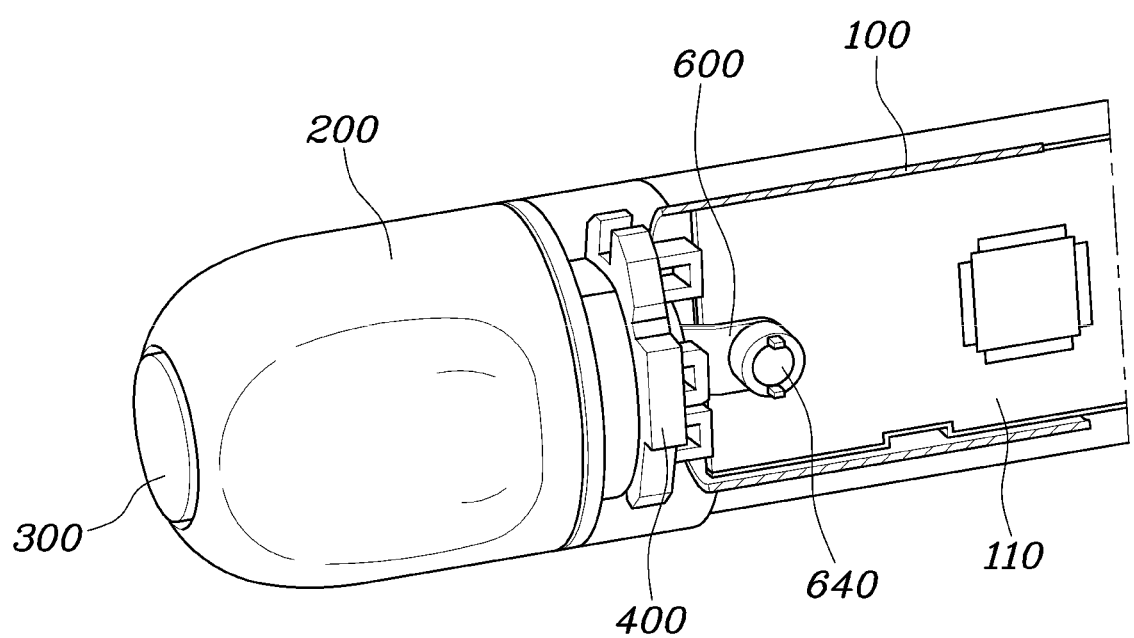
FIG. 1 is a view exemplarily illustrating a shift-by-wire system according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to exemplary forms of the present disclosure, examples of which are illustrated in the accompanying drawings. Wherever possible, the same reference numbers will be used throughout the drawings to refer to the same or like parts.

Figure 2:
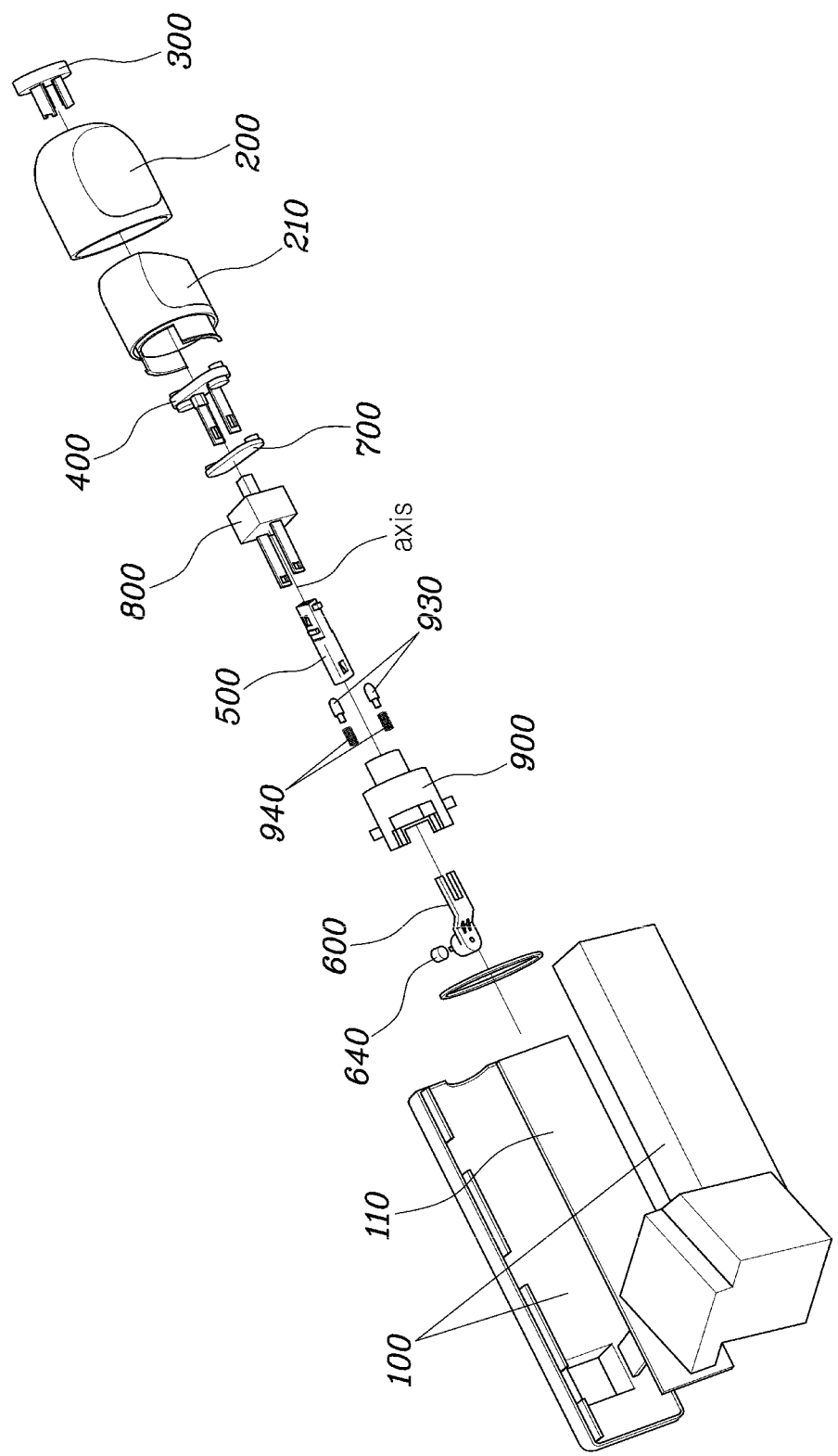
FIG. 2 is an exploded perspective view illustrating elements of the shift-by-wire system in one form of the present disclosure.
Figure 3:
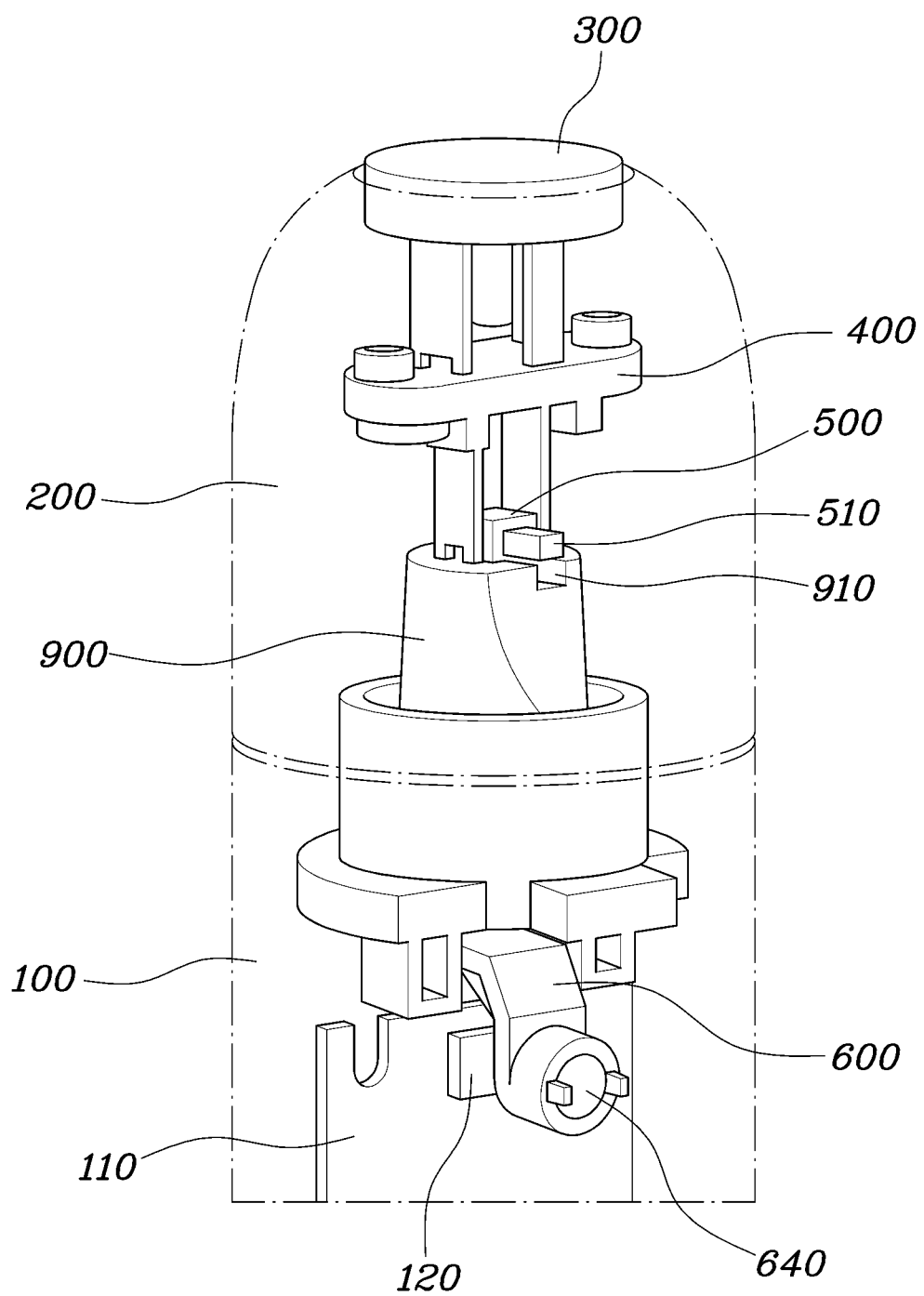
FIG. 3 is a view illustrating the form of arrangement of a button assembly in the shift-by-wire system according to one form of the present disclosure.

FIG. 1 is a view exemplarily illustrating a shift-by-wire system according to one form of the present disclosure, FIG. 2 is an exploded perspective view illustrating elements of the shift-by-wire system according to one form of the present disclosure, and FIG. 3 is a view illustrating the form of arrangement of a button assembly in the shift-by-wire system according to another form of the present disclosure.

Referring to these figures, the shift-by-wire system according to some forms of the present disclosure includes a body 100 configured to have a Hall sensor 120 provided therein, a knob 200 installed so as to be rotatable around an axis of the body 100, a button assembly Ab configured to have a magnet 640 provided to sense rotated and moved states thereof using the Hall sensor 120, rotated together with the knob 200, and moved in the axial direction of the body 100, and a concurrent operation limiting unit configured to mechanically limit movement of the button assembly Ab in the state in which the knob 200 is manipulated so as to be rotated and to mechanically limit rotation of the knob 200 in the state in which the button assembly Ab is manipulated to be moved.

In one form, the body 100 may be formed in a cylindrical shape, and may be installed at a position at which a driver is capable of manipulating the body 100 during driving, for example, on the side surface of a steering column. However, the body 100 may be formed in other various shapes, such as a polygonal box shape, in addition to a cylindrical shape.

A controller 110 is installed inside the body 100, and the Hall sensor 120 configured to sense the magnet 640 may be provided in the controller 110. For reference, the controller 110 may be implemented by a PCB.

Further, according to an exemplary form of the present disclosure, the controller 110 may be implemented through a non-volatile memory (not shown), configured to store data regarding an algorithm configured to control operations of various elements of a vehicle or software commands for reproducing the algorithm, and a processor (not shown) configured to perform operations which will be described below using the data stored in the corresponding memory. Here, the memory and the processor may be implemented as individual chips. Alternatively, the memory and the processor may be implemented as an integrated single chip. Here, the processor may take the form of at least one processor.

Further, the Hall sensor 120 may sense an operation of shifting to the R/N/D gear position and an operation of shifting to the P gear position, and may be controlled to transmit a sensed signal to the controller 110 so as to shift the vehicle to a corresponding gear position.

Further, one end of the knob 200 may be coupled to the end of the body 100 so as to be rotatable.

The button assembly Ab including a button 300 is provided inside the center of the other end of the knob 200 in the axial direction of the body 100, and one end of the button 300 is exposed to the outside from the knob 200 so that the button 300 may be pressed.

In addition, the magnet 640 sensed by the Hall sensor 120 is provided on the button assembly Ab, and thus the magnet 640 is moved and rotated by the button assembly Ab.

Further, when the knob 200 is manipulated so as to be rotated, the button assembly Ab restrained thereby is also rotated to perform shifting to a gear position other than the P gear position depending on the rotation of the knob 200 and the rotation direction of the knob 200. The gear position other than the P gear position may be one of the R gear position, the N gear position and the D gear position, and for example, shifting to the R gear position may be performed when the knob 200 is rotated in one direction, shifting to the D gear position may be performed when the knob 200 is rotated in the other direction, and shifting to the D gear position may be performed when the knob 200 is in the neutral condition.

On the other hand, when the button assembly Ab is manipulated so as to be rectilinearly moved in the axial direction, the button assembly Ab is moved relative to the knob 200 and thus performs shifting to the P gear position.

However, although the button assembly Ab is also rotated in the state in which the knob 200 is manipulated so as to be rotated, as described above, the button assembly Ab is physically engaged with the inside of the body 100 and thus the button 300 is not capable of being manipulated so as to be rectilinearly moved.

Further, in the state in which the button assembly Ab is manipulated so as to be moved, the knob 200 is physically engaged with the inside of the body 100 and thus the knob 200 is not capable of being manipulated so as to be rotated.

That is, the shift-by-wire system physically inhibits or prevents rotation of the knob 200 to shift to the R/N/D gear position and pressing (movement) of the button 300 to shift to the P gear position from being concurrently performed, thereby preventing erroneous operation in shifting, improving marketability of a realized product, and providing the driver's psychological stability.

For reference, the shift-by-wire system according to the present disclosure may be applied not only to shifting systems but also to all operating systems which are operable through a combination of rotation and pressing.

For example, the shift-by-wire system according to one form of the present disclosure may also be applied to a drive mode switch, a heating and ventilating seat, etc.

Therefore, the body 100 may be packaged at various positions, such as a steering wheel, a console box, a crash pad, etc., in addition to the steering column, and the number of levels of rotation of the knob 200 and the number of levels of pressing of the button 300 may be adjusted to be increased or decreased.

Figure 4:
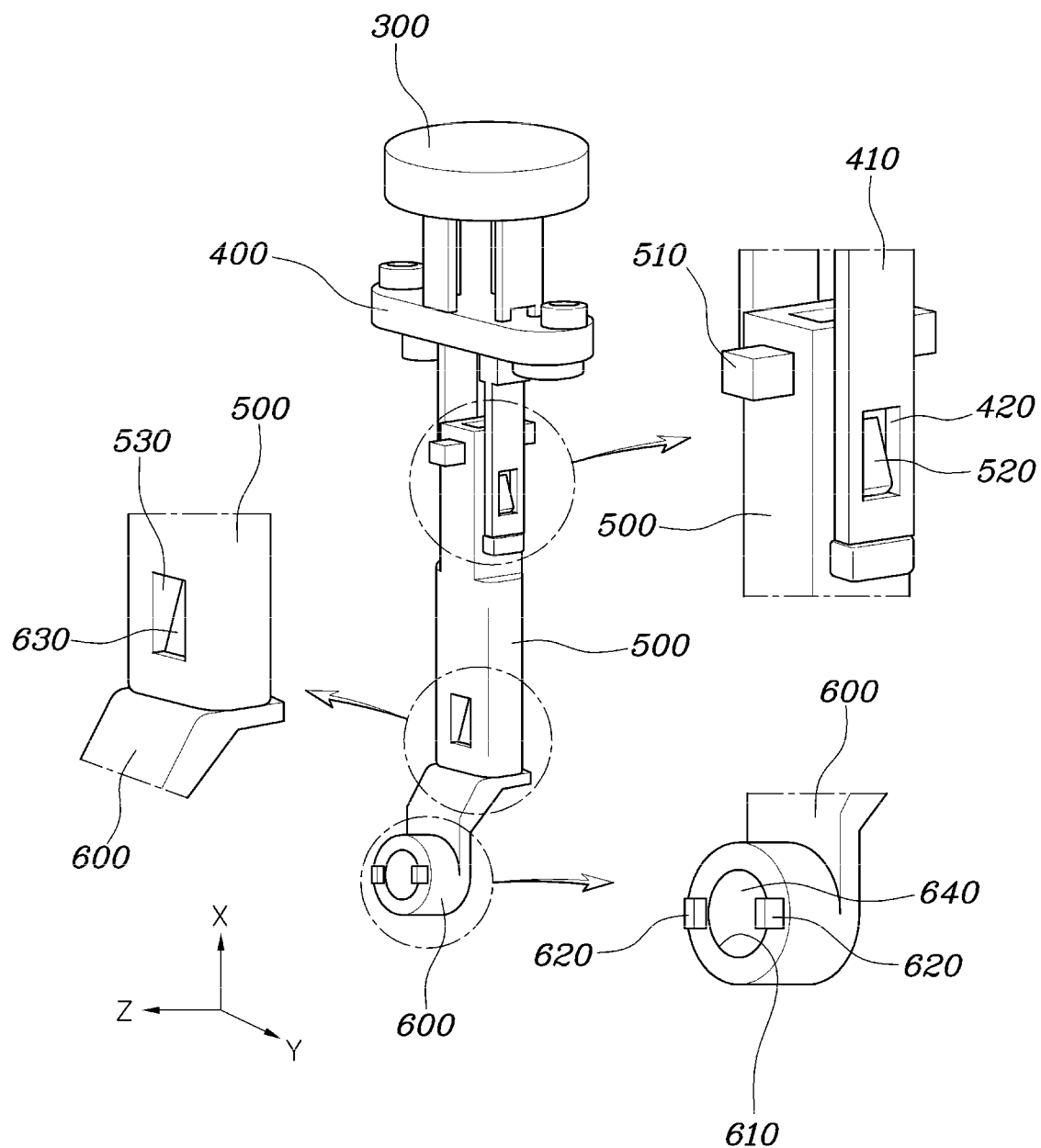
FIG. 4 is a view illustrating the button assembly according to one form of the present disclosure.

FIG. 4 is a view illustrating the button assembly Ab according to one form of the present disclosure, and the button assembly Ab roughly includes the button 300, a shaft 500, and a magnet holder 600.

In more detail, referring to this figure, the button assembly Ab includes the button 300 provided at the end of the knob 200 so as to be pressed, the shaft 500 provided in the body 100 in the axial direction and configured to have one end connected to the button 300, and the magnet holder 600 connected to the other end of the shaft 500 and configured to have the magnet 640 mounted at a position thereof corresponding to the Hall sensor 120.

For example, the button 300 is coupled to the shaft 500 through a button guide 400, which will be described below, the shaft 500 is coupled to the magnet holder 600, and the magnet 640 is fixed to the magnet holder 600, and thus the position of the magnet 640 may be changed depending on movement of the button 300.

Therefore, when the button 300 is pressed, the magnet 640 is moved in the same direction as the pressing direction of the button 300, and thus causes a change in a magnetic field. Therefore, the Hall sensor 120 in the controller 110 senses the change in the magnetic field, and transmits a gear position signal (a signal indicating the P gear position), which a user intends to select, to the vehicle.

In one form, when the button 300 is pressed, the elements constituting the button assembly Ab are rectilinearly moved together with the button 300, but the knob 200 is not moved and the controller 110 and a bullet housing 900, which will be described below, remain in place.

Further, when the knob 200 is rotated, the button assembly Ab is rotated together with the knob 200, and the magnet 640 is rotated in the same direction as the rotating direction of the knob 200, thus causing a change in a magnetic field. Therefore, the Hall sensor 120 in the controller 110 senses the change in the magnetic field and transmits a gear position signal (a signal indicating the P, N or D gear position), which the user intends to select, to the vehicle.

In another form, when the knob 200 is rotated, the elements constituting the button assembly Ab are rotated together with the knob 200, but the controller 110 and the bullet housing 900, which will be described below, remain in place.

Figure 6A:
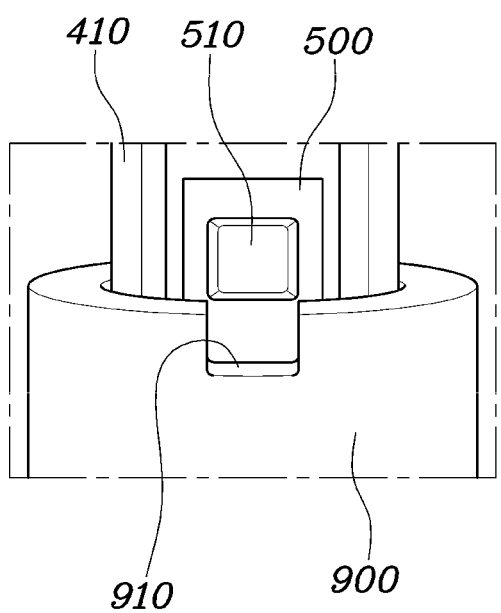
FIGS. 6A and 6B are enlarged views illustrating coupling relationships between operation prevention protrusions and operation prevention recesses in FIGS. 5A and 5B.
Figure 6B:
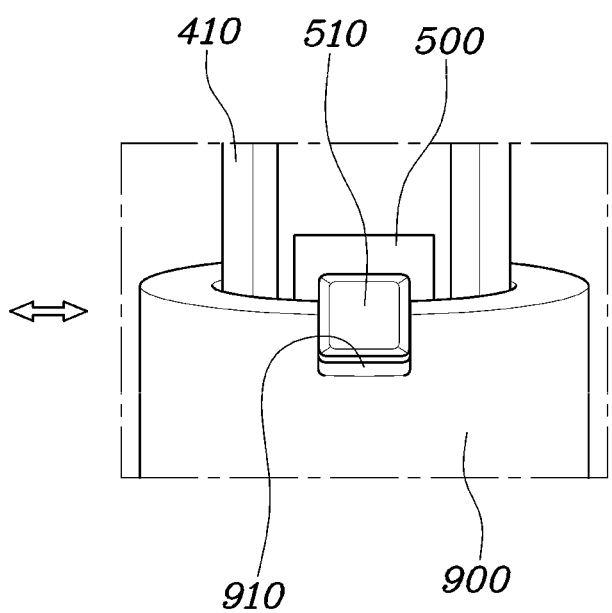

FIGS. 5A and 5B are views illustrating an operation of limiting rotation of the knob 200 in the state in which the button 300 is pressed in one form of the present disclosure, and FIGS. 6A and 6B are enlarged views illustrating coupling relationships between operation prevention protrusions 510 and operation prevention recesses 910 in FIGS. 5A and 5B.

Figure 8A:
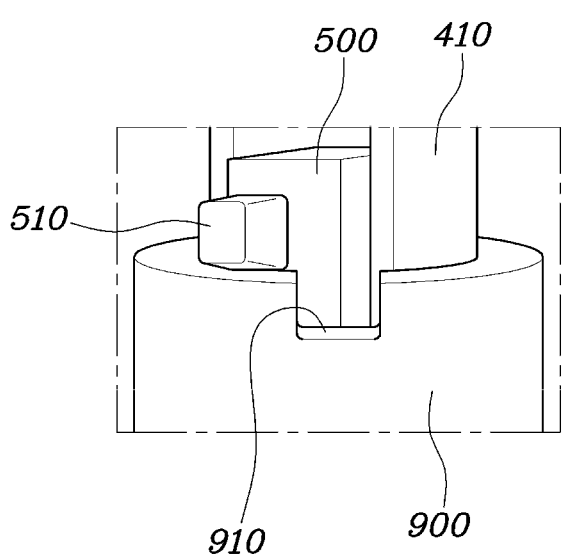
FIGS. 8A and 8B are enlarged views illustrating coupling relationships between the operation prevention protrusions and the operation prevention recesses in FIGS. 7A, 7B and 7C.
Figure 8B:
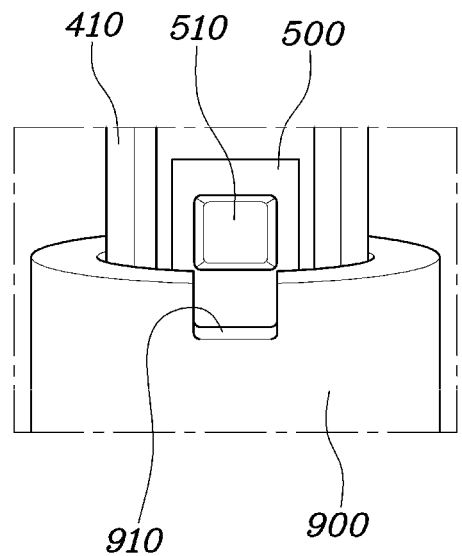

Further, FIGS. 7A to 7C are views illustrating an operation of limiting pressing of the button 300 in the state in which the knob 200 is rotated, and FIGS. 8A and 8B are enlarged views illustrating coupling relationships between the operation prevention protrusions 510 and the operation prevention recesses 910 in FIGS. 7A to 7C.

Referring to these figures, the concurrent operation limiting unit according to one exemplary form of the present disclosure may include the operation prevention protrusions 510 formed on the side surfaces of the shaft 500, the bullet housing 900 fixed to the inside of the body 100 such that the shaft 500 passes through the bullet housing 900 so as to be rotated and rectilinearly moved relative to the bullet housing 900, and the operation prevention recesses 910 formed in one end of the bullet housing 900 corresponding to the operation prevention protrusions 510.

Specifically, the operation prevention protrusions 510 having a rectangular shape are formed on the side surface of one end of the shaft 500.

Further, both ends of the bullet housing 900 are open so that the shaft 500 passes through the bullet housing 900, and the operation prevention recesses 910 having a rectangular shape are formed in the edge of an opening located at the end of the bullet housing 900 close to the button 300.

Particularly, the operation prevention protrusions 510 are located coaxially with the operation prevention recesses 910 in the state in which the knob 200 is in the neutral condition without being rotated in either direction, and thus when the button 300 is pressed in the neutral condition of the knob 200, the operation prevention protrusions 510 enter the operation prevention recesses 910.

As shown in FIGS. 5A, 5B, 6A and 6B, the operation prevention protrusions 510 enter the operation prevention recesses 910 according to the axial movement of the button 300, and thus rotation of the operation prevention protrusions 510 is limited.

That is, because the bullet housing 900 having the operation prevention recesses 910 formed therein is fixed to the body 100, when the operation prevention protrusions 510 enter the operation prevention recesses 910 due to pressing of the button 300, although the knob 200 is manipulated so as to be rotated in this state, the operation prevention protrusions 510 are engaged with the inner surfaces of the operation prevention recesses 910, and thus the knob 200 is not capable of being rotated.

Further, as shown in FIGS. 7A to 7C and FIGS. 8A and 8B, the operation prevention protrusions 510 are supported by the end of the bullet housing 900 according to the rotation of the knob 2000, and thus axial movement of the operation prevention protrusions 510 is limited.

That is, because the bullet housing 900 having the operation prevention recesses 910 formed therein is fixed to the body 100, when the operation prevention protrusions 510 are rotated together with the button assembly Ab about the axis of the button assembly Ab due to rotation of the knob 200, although the button 300 is manipulated so as to be rectilinearly moved in this state, the operation prevention protrusions 510 are supported by the edge of the end of the bullet housing 900, and thus the button 300 is not capable of being pressed.

Therefore, rotation of the knob 200 and pressing of the button 300 are mechanically prevented from being concurrently performed, and thus an operation of shifting to the P gear position and an operation of shifting to a gear position other than the P gear position are not capable of being concurrently performed, thereby preventing erroneous operation in shifting and eliminating the driver's psychological anxiety caused by concerns about erroneous operation in shifting.

Further, referring to FIG. 4 again, couplers between the elements of the button assembly Ab will be described in more detail. The button guide 400 is provided between the button 300 and the shaft 500, the button guide 400 and the shaft 500 are coupled to each other by a coupling structure including hooks and grooves, and the magnet holder 600 and the shaft 500 are coupled to each other by a coupling structure including hooks and grooves.

For example, button legs 310 are formed at one end of the button 300, and the button guide 400 is fixedly coupled to the button legs 310.

Further, guide legs 410, which have a rectangular plate shape and extend towards the shaft 500, are formed at both sides of the button guide 400, and first hook grooves 420, which have a rectangular hole shape, are formed in ends of the guide legs 410.

In addition, first hooks 520, which have a wedge shape having an inclined surface, are formed on the side surfaces of the shaft 500 which are orthogonal to the operation prevention protrusions 510. The first hooks 520 are formed in a shape corresponding to the shape of the first hook grooves 420.

That is, the button guide 400 and the shaft 500 may be coupled to each other by inserting the first hooks 520 into the first hook grooves 420 in the state in which one end of the shaft 500 is entering a space between the two guide legs 410.

In another form, a protrusion serving as a stopper may be further formed at a portion of each of the first hooks 520 connected to the magnet holder 600, and the tip of the corresponding guide leg 410 may be engaged with the protrusion.

Further, the other end of the shaft 500 is formed in a cylindrical shape, and a second hook groove 530 having a rectangular hole shape is formed in one surface of the other end of the shaft 500.

In addition, a second hook 630, which has a wedge shape having an inclined surface, is formed at one end of the magnet holder 600. The second hook 630 is formed in a shape corresponding to the shape of the second hook groove 530.

That is, the shaft 500 and the magnet holder 600 may be coupled to each other by inserting the second hook 630 into the second hook groove 530 in the state in which the other end of the shaft 500 is inserted into the end of the magnet holder 600.

Further, the end of the magnet holder 600 may be coupled to the shaft 500, and a middle portion of the magnet holder 600 connected to the other end of the magnet holder 600 may be formed in a curved shape.

That is, the magnet holder 600 is formed in a curved shape, and thus the magnet 640 is rotated with a radius of rotation greater than the radius of rotation of the shaft 500.

Therefore, a change in the magnetic field of the magnet 640 in response to rectilinear movement of the button assembly Ab and a change in the magnetic field of the magnet 640 in response to rotation of the button assembly Ab are more clearly distinguished from each other, and thus accuracy in sensing a shifting signal may be improved and thereby the quality of a realized product may be improved.

Further, a mounting recess 610 is formed in the magnet holder 600 so that the magnet 640 is inserted into the mounting recess 610, and fusion protrusions 620 are formed at the circumference of the mounting recess 610 so that the magnet 640 may be fixed to the inside of the mounting recess 610 through thermal fusion using the fusion protrusions 620.

For example, the mounting recess 610 having a circular shape may be formed in the other end of the magnet holder 600, and the magnet 640 may be provided in the mounting recess 610. The magnet 640 may be fixed to the inside of the mounting groove 610 by performing thermal fusion on the fusion protrusions 620 formed at the circumference of the mounting groove 610, and thereby, the magnet 640 may be more firmly and stably fixed.

Figure 9:
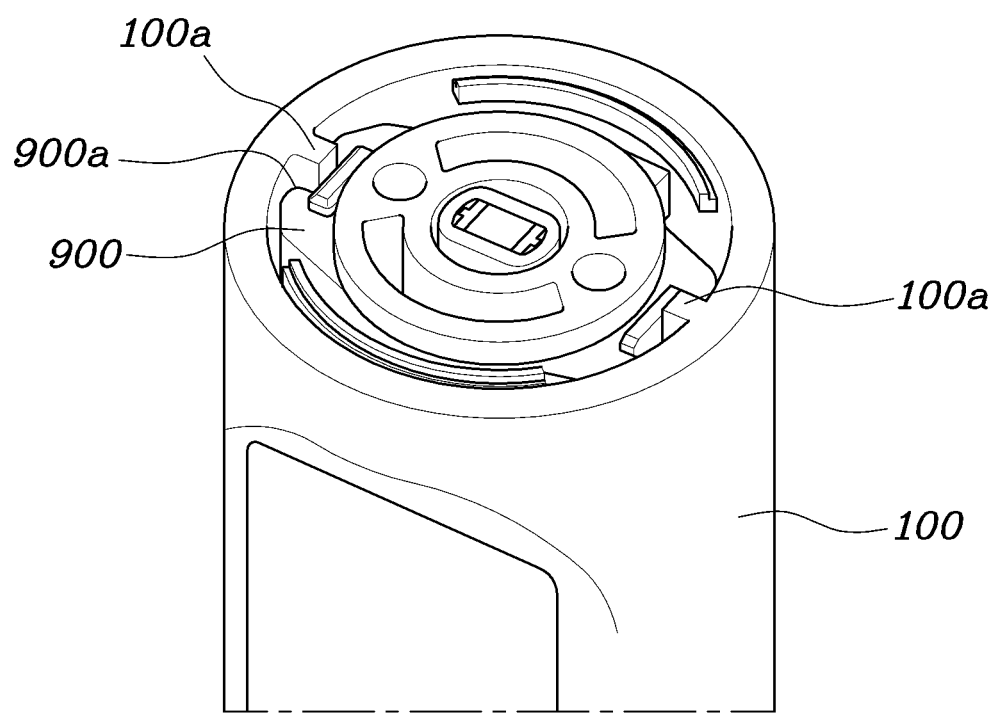
FIG. 9 is a view illustrating a coupling relationship between a bullet housing and a body for restraining rotary movement of the bullet housing with respect to the body according to one form of the present disclosure.
Figure 10:
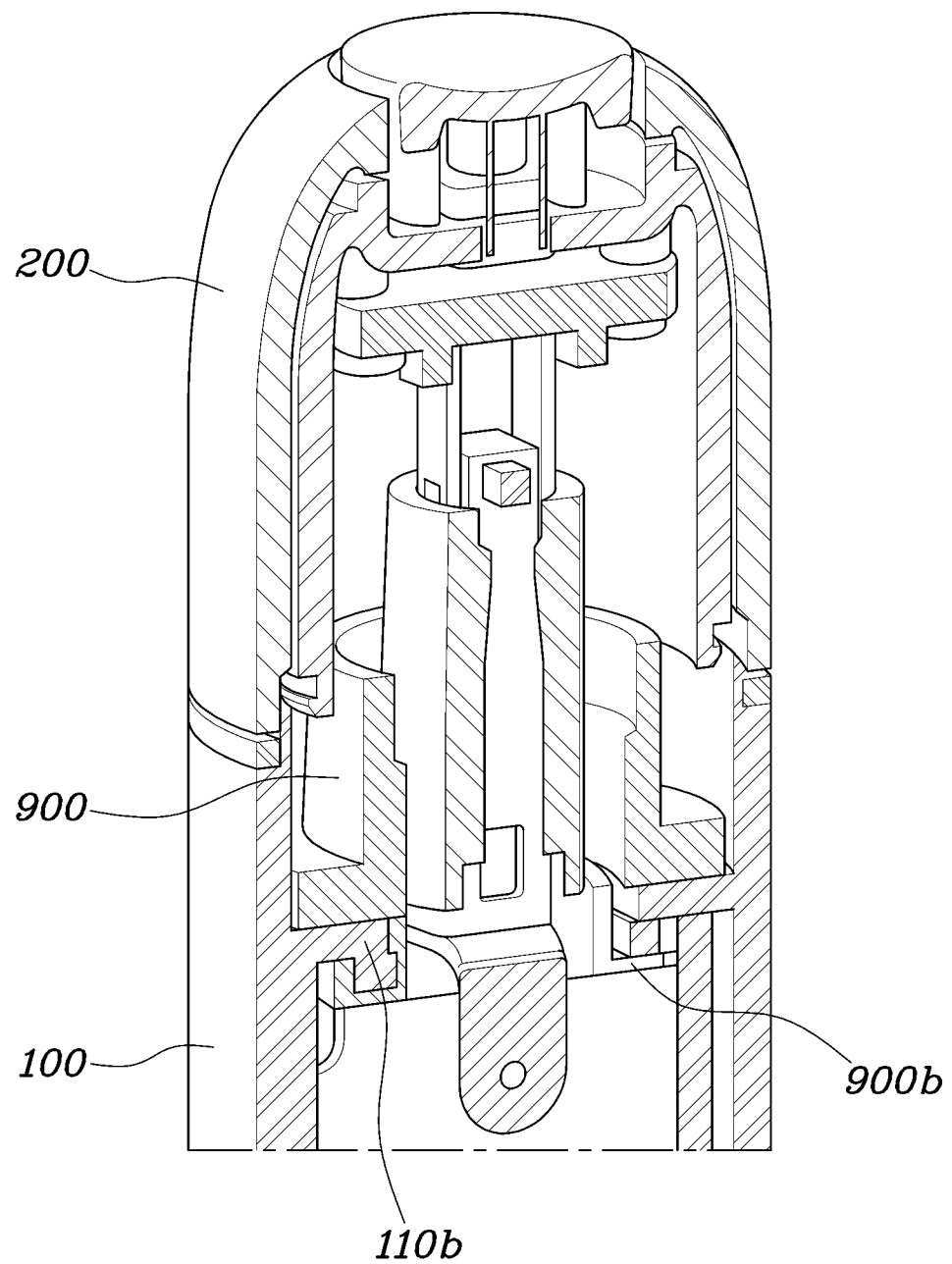
FIG. 10 is a view illustrating a coupling relationship between the bullet housing and the body for rectilinearly moving the bullet housing with respect to the body according to one form of the present disclosure.

FIG. 9 is a view illustrating a coupling relationship between the bullet housing 900 and the body 100 for restraining rotary movement of the bullet housing 900 with respect to the body according to one form of the present disclosure, and FIG. 10 is a view illustrating a coupling relationship between the bullet housing 900 and the body 100 for rectilinearly moving the bullet housing 900 with respect to the body.

Referring to these figures, first rotation restraint parts 100a formed on the inner circumferential surface of the body 100 may be inserted into second rotation restraint parts 900a formed on the outer circumferential surface of the bullet housing 900 in the axial direction so as to restrain rotation of the body 100 and the bullet housing 900 relative to each other, and a second movement restraint part 900b formed on the outer circumferential surface of the bullet housing 900 may hang on and be supported by a first movement restraint part 100b formed on the inner circumferential surface of the body 100 in the axial direction of the body 100 so as to restrain movement of the body 100 and the bullet housing 900 relative to each other.

For example, the first rotation restraint parts 100a formed in a protrusion shape are formed at both sides of the inner circumferential surface of the body 100 in the axial direction, and the second rotation restraint parts 900a formed in a groove shape are formed at both sides of the outer circumferential surface of the bullet housing 900 in the axial direction. The first rotation restraint parts 100a and the second rotation restraint parts 900a are formed in shapes corresponding to each other.

Therefore, the first rotation restraint parts 100a are inserted into the second rotation restraint parts 900a, and thereby, rotation of the bullet housing 900 with respect to the body 100 is limited.

Further, the first movement restraint part 100b protrudes from the inner circumferential surface of the body 100 in the radially inward direction, and the second movement restraint part 900b extends from the lower end of the outer circumferential surface of the bullet housing 900 in the radially outward direction. The second movement restraint part 900b is located close to the controller 110 based on the first movement restraint part 100b.

Therefore, the second movement restraint part 900b hangs on the protruding plane of the first movement restraint part 100b so as to be supported thereby, and thus, rectilinear movement of the bullet housing 900 with respect to the body 100 is limited.

Accordingly, the rotation and the rectilinear movement of the bullet housing 900 are restrained, and the bullet housing 9000 may thus be fixed to the inside of the body 100.

Figure 11:
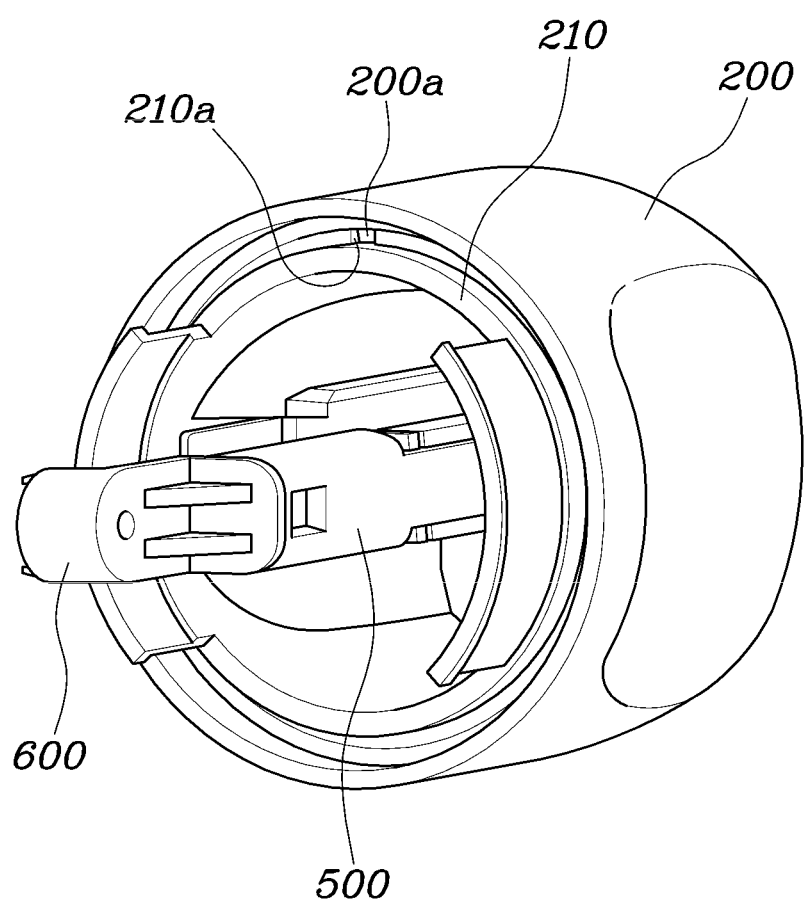
FIG. 11 is a view illustrating the state in which an inner knob is assembled with the inside of the knob according to one form of the present disclosure.
Figure 12A:
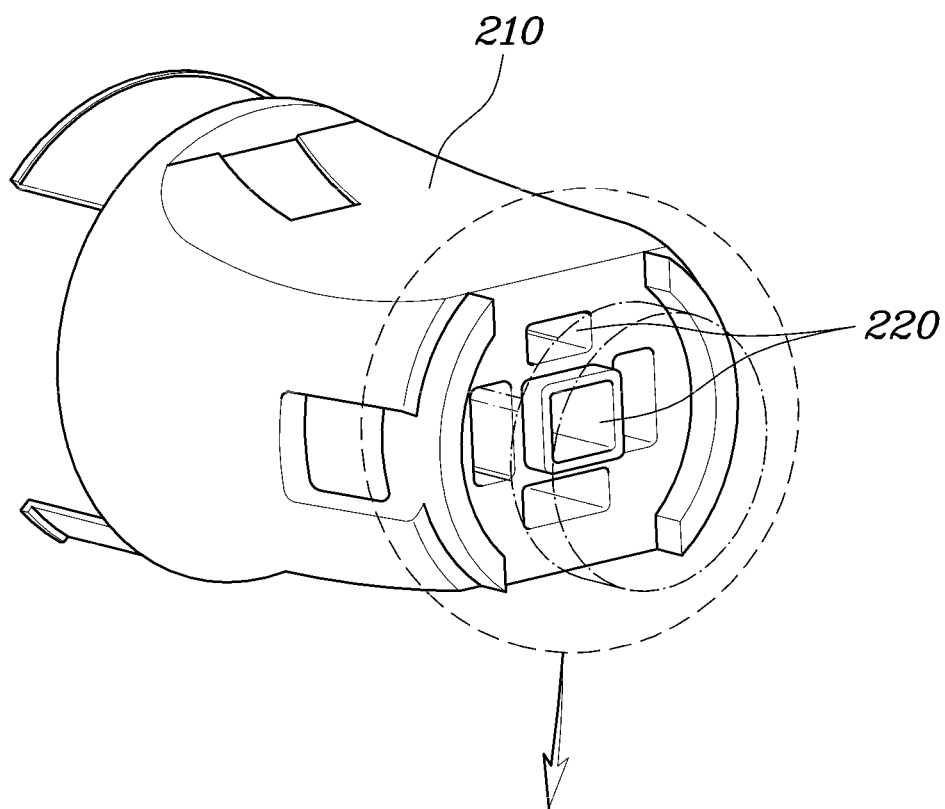
FIGS. 12A and 12B are views illustrating the state in which the button is assembled with the inner knob according to one form of the present disclosure.
Figure 12B:
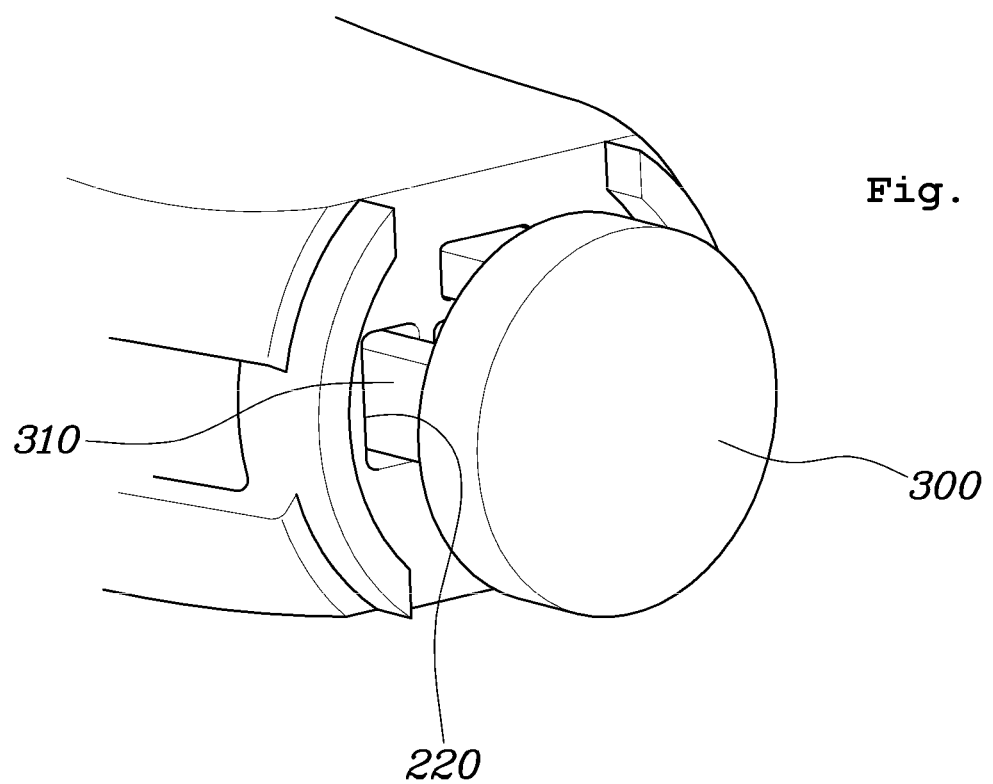

FIG. 11 is a view illustrating the state in which an inner knob 210 is assembled with the inside of the knob 200 according to one form of the present disclosure, and FIGS. 12A and 12B are views illustrating the state in which the button 300 is assembled with the inner knob 201 according to another form of the present disclosure.

Referring to these figures, the button legs 310 are formed at one end of the button 300 so as to extend towards the body 100, the inner knob 210 is assembled with the inside of the knob 200 so as to be surrounded by the inner surface of the knob 200, button leg insertion holes 220 are formed in one end of the inner knob 210, and the button legs 310 are inserted into the button leg insertion holes 220 so as to restrain movement of the button 300 and the knob 200 relative to each other.

For example, insertion protrusions 200a protrude from both sides of the inner circumferential surface of the knob 200 in the length direction, i.e., in the forward and rearward directions, and insertion grooves 210a are formed in both sides of the outer circumferential surface of the inner knob 210 in the length direction, i.e., in the forward and rearward directions. The insertion protrusions 200a and the insertion grooves 210a are formed in shapes corresponding to each other, and thereby, the inner knob 210 may be assembled with the inside of the knob 200.

Further, the button legs 310 having a rectangular plate shape are formed at the end of the button 300, and the button legs 310 extend in the axial direction so as to form the same angle in the circumferential direction of the button 300 about the axis thereof.

The button leg insertion holes 220 having a shape corresponding to the shape of the button legs 310 are formed at positions corresponding to the button legs 310 in the end of the inner knob 210 facing the button 300, and the button legs 310 are inserted into the button leg insertion holes 220.

Therefore, when the inner knob 210 is rotated upon rotation of the knob 200, the button 300 restrained by the inner knob 210 is also rotated.

Figure 13A:
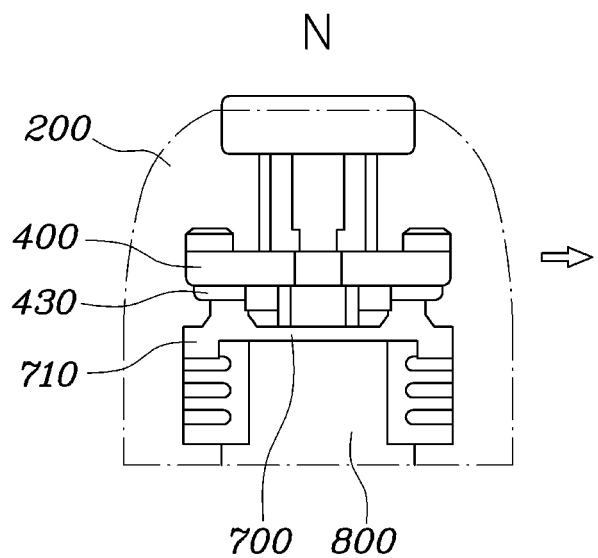
FIGS. 13A and 13B are views illustrating an operation of restoring movement of the button according to one form of the present disclosure.
Figure 13B:
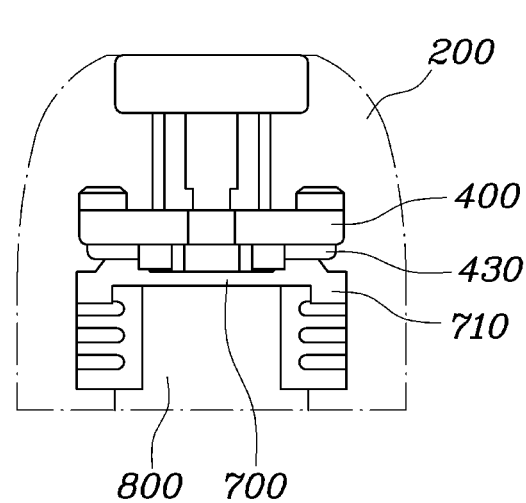

FIGS. 13A and 13B are views illustrating an operation of restoring movement of the button 300 according to one form of the present disclosure.

In one form, the button guide 400 may be fixed to one end of the button 300, and a movement restoration unit configured to provide elastic restoring force with respect to the axial movement of the button guide 400 due to the movement of the button 300 may be provided.

Referring to these figures, the movement restoration unit includes a groove member 800 supported by one end of the bullet housing 900 so that axial movement of the groove member 800 is limited, and a return member 700 formed of an elastic material and configured to have one end coupled to the groove member 800 and the other end having dome parts 710, which protrude so as to be pressed by the button guide 400.

Figure 15:
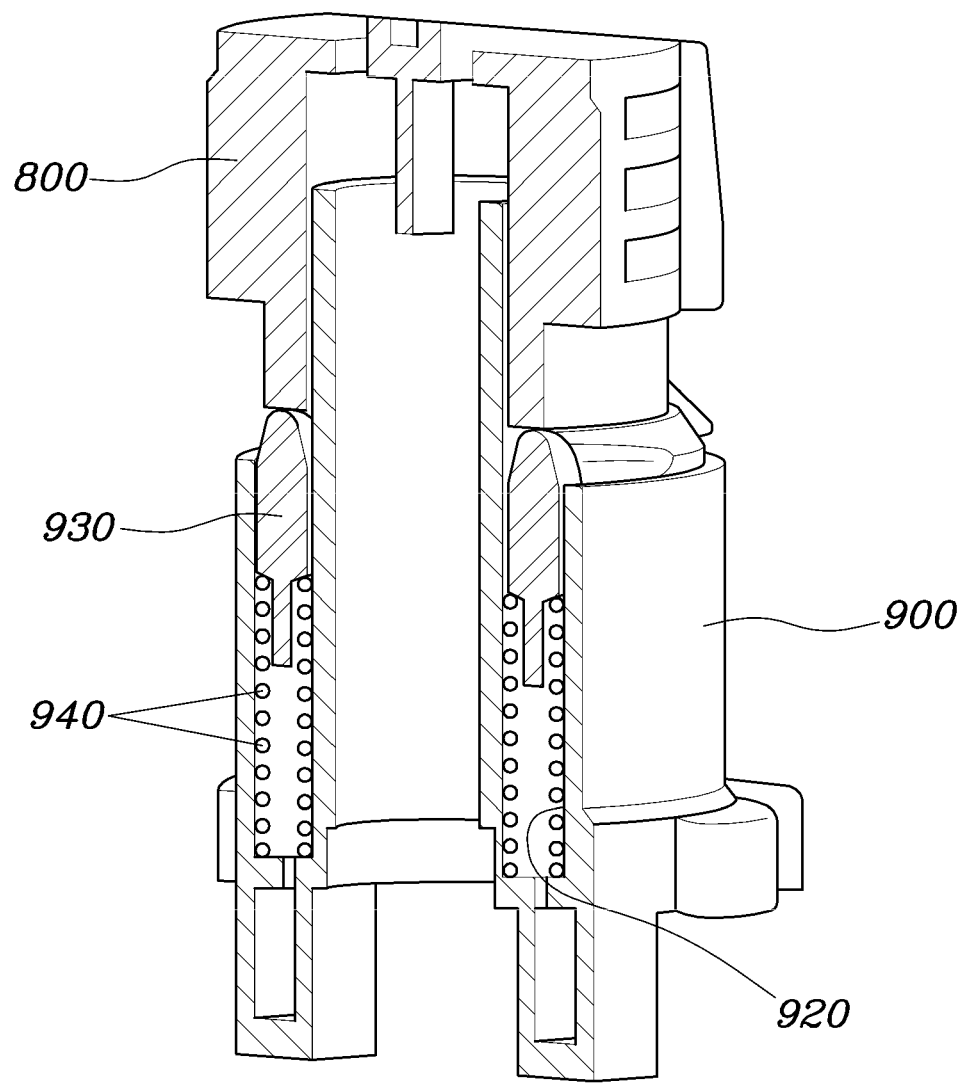
FIG. 15 is a view illustrating an exemplary configuration of a rotation restoration unit according to the present disclosure.

For example, referring to FIG. 15, the center of the lower end of the groove member 800 is open, and the upper end of the bullet housing 900 facing the groove member 800 is inserted into the open center of the lower end of the groove member 800. Here, the edge of the lower end of the groove member 800 is supported by a flange expanding outwards from the middle section of the outer circumferential surface of the bullet housing 900, and thereby, downward movement of the groove member 800 is limited.

Further, as shown in FIGS. 13A and 13B, the lower end of the return member 700 is assembled with the upper end of the groove member 800. The dome parts 710 protrude from both sides of the return member 700 towards the button guide 400. The dome parts 710 are formed of an elastic material and have a hollow structure, and thus push pressing parts 430 in a direction opposite the pressing direction of the pressing parts 430 due to the repulsive force of the dome parts 710 when the pressing parts 430 press the dome parts 710.

The pressing parts 430 protrude from both sides of the button guide 40 towards the return member 700. The pressing parts 430 are formed at positions corresponding to the dome parts 710.

That is, when the button 300 is pressed, the pressing parts 430 formed on the button guide 400 press the dome parts 710 so as to compress the dome parts 710 and, when pressing force is released from the button 300, the button 300 is restored to the original position thereof due to the repulsive force of the dome parts 710.

Therefore, a user may be provided with a satisfying and distinctive manipulation sensation upon shifting to the P gear position through the restoring force of the dome parts 710.

As described above, the groove member 800 is supported by the bullet housing 900 when the dome parts 710 are compressed, and thus only compression of the dome parts 710 is performed, and the return member 700 is not moved rectilinearly.

In one form, the button 300 may be configured such that rectilinear movement of the button 300 is guided by the groove member 800.

Figure 14:
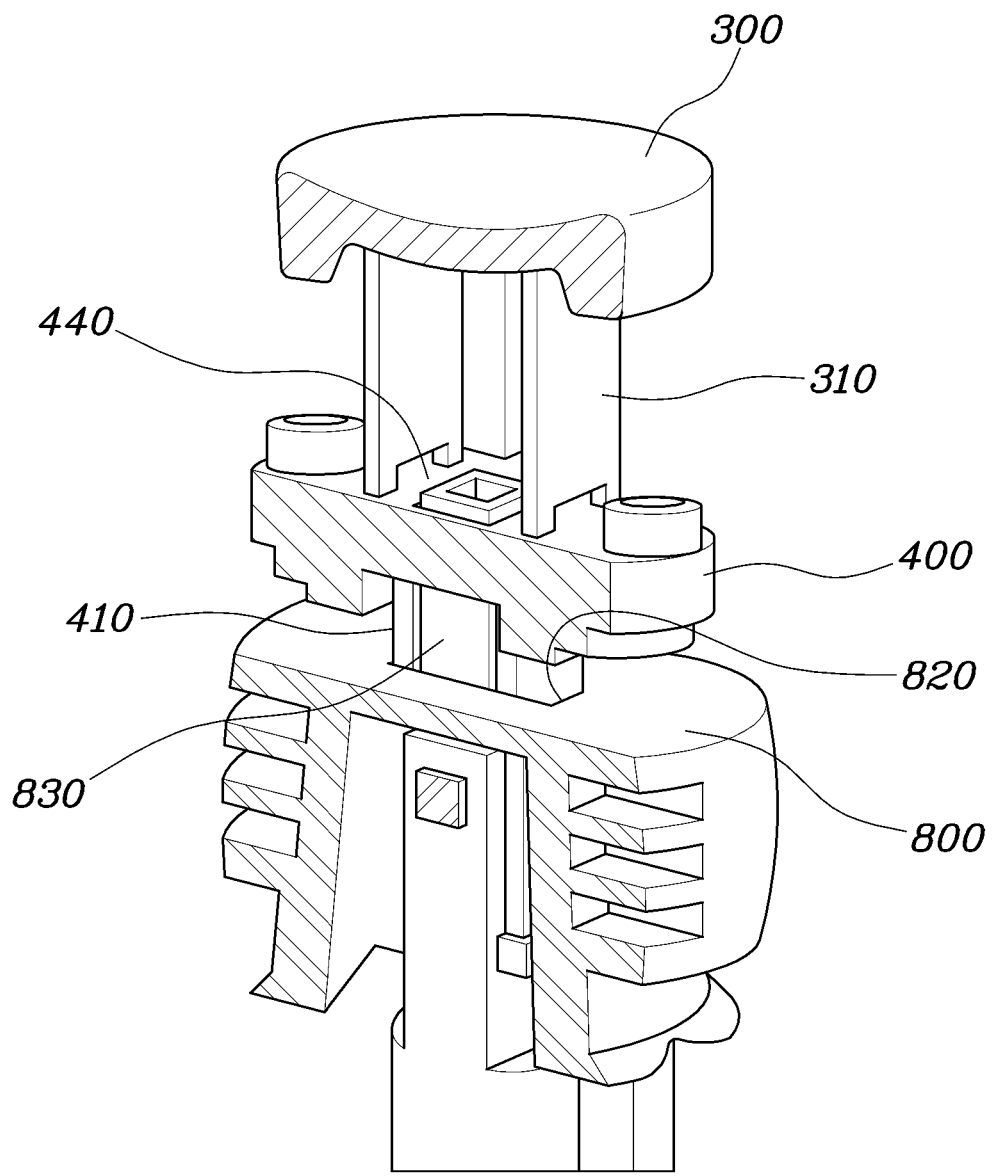
FIG. 14 is a view illustrating a structure for guiding rectilinear movement of the button according to one form of the present disclosure.

FIG. 14 is a view illustrating a structure for guiding rectilinear movement of the button 300 according to one form of the present disclosure. Referring to this figure, a guide hole 440 is formed in the center of the button guide 400, the guide legs 410 are formed at one end of the guide hole 440 so as to extend towards the groove member 800, a guide bar 830 is formed at the center of one end of the groove member 800 and is inserted into the guide hole 440, and guide leg insertion holes 820 are formed in the side surfaces of the guide bar 830 so that the guide legs 410 may be inserted into the guide leg insertion holes 820.

That is, the guide bar 830 formed on the groove member 800 is formed in a rectangular bar shape, the guide hole 440 formed in the button guide 400 is formed in a rectangular hole shape corresponding to the shape of the guide bar 830, and thereby, the guide bar 830 is inserted into the guide hole 440 so as to be guided.

Further, the guide legs 410 are formed at both sides of the guide hole 440, the guide leg insertion holes 820 corresponding to the guide legs 410 are formed in a rectangular hole shape at both sides of the guide bar 830, and thereby, the guide legs 410 are inserted into the guide leg insertion holes 820 so as to be guided.

As such, because the guide bar 830 is guided into the guide hole 440 and the guide legs 410 are guided into the guide leg insertion holes 820, rectilinear movement of the button 300 and the button guide 400 may be more stably guided.

FIG. 15 is a view illustrating an exemplary configuration of a rotation restoration unit according to one form of the present disclosure, and FIGS. 16A to 16C are views illustrating an operation of restoring rotation of the knob 200 through the rotation restoration unit according to another form of the present disclosure.

In one form, the rotation restoration unit configured to provide elastic restoring force with respect to the rotation of the button assembly Ab upon the rotation of the knob 200 may be provided.

Referring to these figures, the rotation restoration unit includes the groove member 800 provided to be rotatable relative to the bullet housing 900 while rotation of the groove member 800 is restrained by the button assembly, and configured to V-shaped grooves 810 formed in a portion of the groove member 800 facing the bullet housing 900 along a rotation path, bullets 930 inserted into bullet insertion grooves 920 formed in the bullet housing 900 so as to be supported by the grooves 810, and return springs 940 configured to provide elastic restoring force to the bullets 930 towards the grooves 810.

Further, the bullet insertion grooves 920 may be formed in the axial direction of the body 100 such that the openings in the bullet insertion grooves 920 face the groove member 800, and the return springs 940 may be provided between the inner ends of the bullet insertion grooves 920 and the bullets 930.

For example, the bullet insertion grooves 920 are formed in both sides of the bullet housing 900, and the bullets 930 are inserted into the bullet insertion grooves 920. One end of each of the return springs 940 having a coil spring structure is supported by the inner end of a corresponding one of the bullet insertion grooves 920, and the other end of each of the return springs 940 is supported by one end of a corresponding one of the bullets 930.

Further, the grooves 810 having a V-shaped groove profile are formed in the groove member 800 facing the bullet insertion grooves 920, and the other end of each of the bullets 930 is supported by the inner surface of a corresponding one of the grooves 810.

That is, when the knob 200 is rotated in one direction or in the other direction, the groove member 800 is rotated together with the button 300, the bullets 930 located in the valleys of the grooves 810 are guided by the inclined profiles of the grooves 810, and are rectilinearly moved in a direction in which the return springs 940 are compressed.

When the bullets 930 are moved and thus compress the return springs 940, the bullets 930 are supposed to be restored to the valleys of the grooves 810 along the inclined profiles of the grooves 810, and thus the groove member 800 may be restored to the position thereof prior to rotation, i.e., the knob 200 may be restored to the neutral condition.

As such, the bullets 930 are moved along the grooves 810 by the compressive force and the elastic restoring force of the return springs 940 and thus rotate the knob 200 so as to restore the knob 200 to the initial position thereof, and thereby, a user may be provided with a satisfying and distinctive manipulation sensation upon rotation of the knob 200.

Hereinafter, operations of shifting to the respective gear positions using the shift-by-wire system according to exemplary forms of the present disclosure will be described.

First, referring to FIGS. 5A and 5B, an operation of shifting to the P gear position will be described. When the button 300 is pressed in the direction of the body 100, as shown in FIG. 5B, the button assembly Ab including the button 300 is moved in the movement direction of the button 300, and the magnet 640 is also moved in the movement direction of the button 300.

The magnet 640 is moved in the same direction as the pressing direction of the button 300, and makes a change in the magnetic field, and the Hall sensor 120 in the controller 110 senses the change in the magnetic field, generates a P gear position shifting signal and transmits the signal to the vehicle so that the vehicle shifts to the P gear position.

Particularly, in the state in which the operation prevention protrusions 510 enter the operation prevention recesses 910 due to pressing of the button 300, the operation prevention protrusions 510 are engaged with the inner surfaces of the operation prevention recesses 910, and thus the knob 200 is not capable of being rotated.

Further, as shown in FIGS. 13A and 13B, when the button 300 is pressed, the pressing parts 430 formed on the button guide 400 press the dome parts 710 so as to compress the dome parts 710 and, when pressing force is released from the button 300 by removing a user's hand from the button 300, the button 300 is restored to the original position thereof due to the repulsive force of the dome parts 710, thereby being capable of providing a user with a satisfying and distinctive manipulation sensation upon shifting to the P gear position.

Next, referring to FIGS. 7A to 7C, operations of shifting to the R gear position and the D gear position will be described. When the button 300 is rotated in one direction under the N gear position state, as shown in FIG. 7A, the button assembly Ab together with the knob 200 is rotated in the rotation direction of the knob 200, and the magnet 640 is also rotated in the rotation direction of the knob 200.

The magnet 640 is moved in the same direction as the rotation direction of the knob 200 and makes a change in the magnetic field, and the Hall sensor 120 in the controller 110 senses the change in the magnetic field, generates a D gear position shifting signal and transmits the signal to the vehicle so that the vehicle shifts to the D gear position.

In the same manner, when the button 300 is rotated in the other direction under the N gear position state, as shown in FIG. 7C, the button assembly Ab together with the knob 200 is rotated in the rotation direction of the knob 200, and the magnet 640 is also rotated in the rotation direction of the knob 200.

The magnet 640 is moved in the same direction as the rotation direction of the knob 200 and makes a change in the magnetic field, and the Hall sensor 120 in the controller 110 senses the change in the magnetic field, generates an R gear position shifting signal and transmits the signal to the vehicle so that the vehicle shifts to the R gear position.

Particularly, in the state in which the operation prevention protrusions 510 are rotated due to rotation of the knob 200, the operation prevention protrusions 510 are supported by the edge of the end of the bullet housing 900, and thus, although force is applied to the button 300, the button 300 is not capable of being pressed.

Further, as shown in FIGS. 16A to 16C, when the knob 200 is rotated in one direction or in the other direction, the bullets 930 are guided along the inclined profiles of the grooves 810 and compress the return springs 940.

In this state, when a user's hand is removed from the knob 200, the bullets 930 are restored to the valleys of the grooves 810 along the inclined profiles of the grooves 810 due to the elastic restoring force of the return springs 940, and thus the knob 200 may be rotated so as to be restored to the neutral condition thereof.

As such, the knob 200 is elastically restored by the elastic restoring force of the return springs 940, thereby providing the user with a satisfying and distinctive manipulation sensation upon shifting to the R gear position or the D gear position.

As described above, the shift-by-wire system according to one form of the present disclosure mechanically inhibits or prevents rotation of the knob 200 and pressing of the button 300 from being concurrently performed, and thus prevents an operation of shifting to the P gear position and an operation of shifting to a gear position other than the P gear position, i.e., the R gear position or the D gear position, from being concurrently performed, thereby preventing erroneous operation in shifting and eliminating the driver's psychological anxiety caused by concerns about erroneous operation in shifting.

Further, the shift-by-wire system according to the present disclosure integrates the Hall sensor 120 and the controller 110 for shifting to the P gear position and shifting to the R/N/D gear position, and may thus reduce the size of a package through simplification of the structure of the shift-by-wire system so as to achieve cost and weight reduction, and may increase design freedom so as to be more aesthetically pleasing to a driver and to increase space utilization.

As is apparent from the above description, a shift-by-wire system according to the present disclosure mechanically prevents rotation of a knob and pressing of a button from being concurrently performed, and thus prevents an operation of shifting to the P gear position and an operation of shifting to a gear position other than the P gear position, i.e., the R gear position or the D gear position, from being concurrently performed, thereby preventing erroneous operation in shifting and eliminating the driver's psychological anxiety caused by concerns about erroneous operation in shifting.

Further, the shift-by-wire system according to the present disclosure integrates a Hall sensor and a controller for shifting to the P gear position and shifting to the R/N/D gear position, and may thus reduce the size of a package through simplification of the structure of the shift-by-wire system so as to achieve cost and weight reduction, and may increase design freedom so as to be more aesthetically pleasing to a driver and to increase space utilization.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A shift-by-wire system comprising:
    a body configured to have a Hall sensor provided therein;
    a knob configured to be rotatable around an axis of the body;
    a button assembly including a magnet configured to rotate together with the knob, wherein the Hall sensor is configured to sense a rotation and a movement of the magnet, and the button assembly is configured to move in an axial direction of the body,
    wherein the button assembly comprises:
        a button provided at one end of the knob so as to be pressed, and
        a shaft provided in the body in the axial direction and including one end connected to the button; and
    a concurrent operation limiting unit configured to:
        mechanically limit movement of the button assembly in a state in which the knob is manipulated so as to be rotated, and
        mechanically limit rotation of the knob in a state in which the button assembly is manipulated so as to be moved,
    wherein the concurrent operation limiting unit comprises:
        operation prevention protrusions formed on side surfaces of the shaft;

a bullet housing fixed to an inside of the body such that the shaft passes through the bullet housing so as to be rotated and rectilinearly moved relative to the bullet housing; and
operation prevention recesses formed in one end of the bullet housing corresponding to the operation prevention protrusions.

2. The shift-by-wire system according to claim 1, wherein:
shifting to a gear position other than a parking (P) gear position is performed based on rotation of the knob and a rotation direction of the knob; and
shifting to the P gear position is performed based on the movement of the button assembly.

3. The shift-by-wire system according to claim 1, wherein the button assembly further comprises:
a magnet holder connected to a remaining end of the shaft and configured to have the magnet mounted at a position thereof corresponding to the Hall sensor.

4. The shift-by-wire system according to claim 3, wherein:
a button guide is provided between the button and the shaft;
the button guide and the shaft are coupled to each other by a first coupling structure comprising hooks and grooves; and
the magnet holder and the shaft are coupled to each other by a second coupling structure comprising hooks and grooves.

5. The shift-by-wire system according to claim 4, wherein:
one end of the magnet holder is coupled to the shaft; and
a middle portion of the magnet holder connected to a remaining end thereof is formed in a curved shape.

6. The shift-by-wire system according to claim 3, wherein:
a mounting recess is formed in the magnet holder so that the magnet is inserted into the mounting recess; and
fusion protrusions are formed at a circumference of the mounting recess so that the magnet is fixed to an inside of the mounting recess through thermal fusion using the fusion protrusions.

7. The shift-by-wire system according to claim 3, wherein:
button legs are formed at one end of the button so as to extend towards the body;
an inner knob is assembled with the knob so as to be surrounded by an inner surface of the knob; and
button leg insertion holes are formed in one end of the inner knob, and the button legs are inserted into the button leg insertion holes so as to restrain movement of the button and the knob relative to each other.

8. The shift-by-wire system according to claim 3, further comprising:
a button guide fixed to one end of the button; and
a movement restoration unit configured to provide an elastic restoring force with respect to movement of the button guide in the axial direction when the button is moved.

9. The shift-by-wire system according to claim 8, wherein the movement restoration unit comprises:
a groove member supported by one end of a bullet housing such that movement of the groove member in the axial direction is limited; and
a return member formed of an elastic material and including: a first end coupled to the groove member and a second end having dome parts configured to protrude so as to be pressed by the button guide.

10. The shift-by-wire system according to claim 8, wherein:
a guide hole is formed in a center of the button guide;
guide legs are formed at one end of the guide hole and configured to extend towards a groove member;
a guide bar is formed at a center of one end of the groove member and configured to insert into the guide hole; and
guide leg insertion holes are formed in side surfaces of the guide bar such that the guide legs are inserted into the guide leg insertion holes.

11. The shift-by-wire system according to claim 3, further comprising: a rotation restoration unit configured to provide an elastic restoring force with respect to rotation of the button assembly when the knob is rotated.

12. The shift-by-wire system according to claim 11, wherein the rotation restoration unit comprises:
a groove member provided to be rotatable relative to a bullet housing while rotation of the groove member is restrained by the button assembly, and configured to have V-shaped grooves formed in a portion of the groove member facing the bullet housing along a rotation path;
bullets inserted into bullet insertion grooves formed in the bullet housing so as to be supported by the grooves; and
return springs configured to provide an elastic restoring force to the bullets towards the grooves.

13. The shift-by-wire system according to claim 12, wherein:
the bullet insertion grooves are formed in the axial direction of the body such that openings in the bullet insertion grooves face the groove member; and
the return springs are provided between inner ends of the bullet insertion grooves and the bullets.

14. The shift-by-wire system according to claim 1, wherein:
the operation prevention protrusions enter the operation prevention recesses by the movement of the button in the axial direction, so that rotation of the operation prevention protrusions is limited; and
the operation prevention protrusions are supported by the end of the bullet housing by the rotation of the knob, such that movement of the operation prevention protrusions in the axial direction is limited.

15. The shift-by-wire system according to claim 1, wherein:
first rotation restraint parts formed on an inner circumferential surface of the body are inserted into second rotation restraint parts formed on an outer circumferential surface of the bullet housing in the axial direction so as to restrain rotation of the body and the bullet housing relative to each other; and
a second movement restraint part formed on an outer circumferential surface of the bullet housing hangs on and is supported by a first movement restraint part formed on an inner circumferential surface of the body in the axial direction so as to restrain movement of the body and the bullet housing relative to each other.

16. A shift-by-wire system comprising:
a body configured to have a Hall sensor provided therein;
a knob configured to rotate around an axis of the body and thus perform shifting to a gear position other than a parking (P) gear position;
a button assembly including a magnet configured to rotate together with the knob, the button assembly configured to move in an axial direction of the body so as to perform shifting to the P gear position; wherein the Hall sensor is configured to sense a rotation and a movement of the magnet, wherein the button assembly comprises:
- a button provided at one end of the knob so as to be pressed, and
- a shaft provided in the body in the axial direction and including one end connected to the button; and a concurrent operation limiting unit configured to:
- mechanically limit movement of the button assembly in a state in which the knob is manipulated so as to be rotated, and
- mechanically limit rotation of the knob in a state in which the button assembly is manipulated so as to be moved, wherein the concurrent operation limiting unit comprises:
- operation prevention protrusions formed on side surfaces of the shaft,
- a bullet housing fixed to an inside of the body such that the shaft passes through the bullet housing so as to be rotated and rectilinearly moved relative to the bullet housing; and
- operation prevention recesses formed in one end of the bullet housing corresponding to the operation prevention protrusions.

17. A shift-by-wire system comprising:
a body configured to have a Hall sensor provided therein;
a knob configured to be rotatable around an axis of the body;
a button assembly including a magnet configured to rotate together with the knob, wherein rotated and moved states of the magnet are sensed by the Hall sensor, the button assembly is configured to move in an axial direction of the body and comprises a button provided at one end of the knob so as to be pressed; and
a concurrent operation limiting unit configured to:
- mechanically limit movement of the button assembly in a state in which the knob is manipulated so as to be rotated, and
- mechanically limit rotation of the knob in a state in which the button assembly is manipulated so as to be moved, wherein:
- button legs are formed at one end of the button so as to extend towards the body;
- an inner knob is assembled with the knob so as to be surrounded by an inner surface of the knob; and
- button leg insertion holes are formed in one end of the inner knob, and the button legs are inserted into the button leg insertion holes so as to restrain movement of the button and the knob relative to each other.

* * * * *